G. A. WELD.
VALVE CONTROLLING APPLIANCE.
APPLICATION FILED FEB. 20, 1905.
1,056,867.
Patented Mar. 25, 1913.
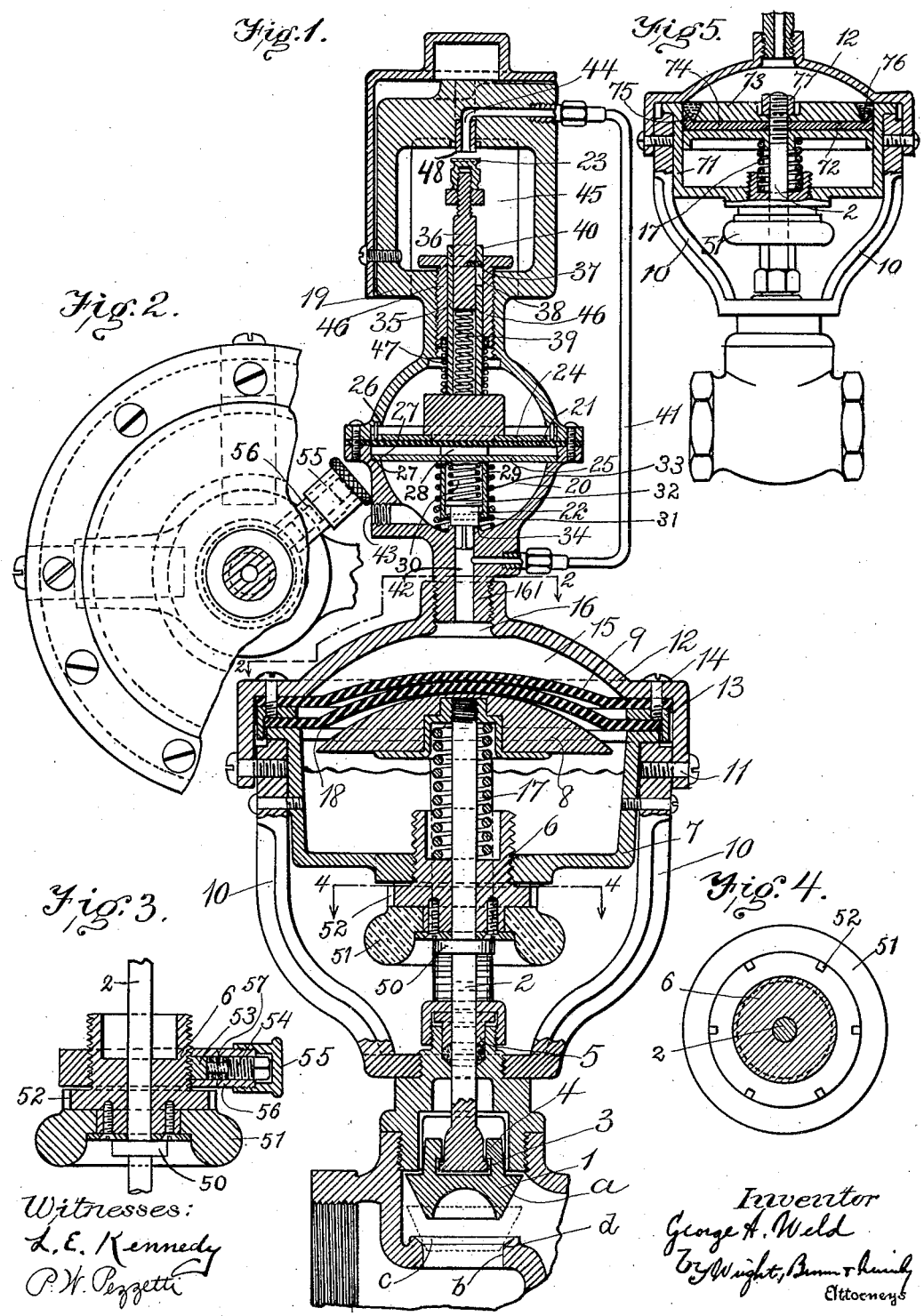

UNITED STATES PATENT OFFICE.

GEORGE A. WELD, OF WINCHESTER, MASSACHUSETTS.

VALVE-CONTROLLING APPLIANCE.

1,056,867.  Specification of Letters Patent.  Patented Mar. 25, 1913.

Application filed February 20, 1905. Serial No. 246,367.

*To all whom it may concern:*

Be it known that I, GEORGE A. WELD, of Winchester, in the county of Middlesex and State of Massachusetts, have invented certain new and useful Improvements in Valve-Controlling Appliances, of which the following is a specification.

This invention has reference to devices which automatically operate admission-valves for steam engines, steam-heating systems, and the like, by means of compressed air or other suitable operating fluid, and consists of the improvements in such devices hereinafter described and claimed.

In the accompanying drawings, forming a part of this specification, Figure 1 represents a longitudinal section of a valve and operating mechanism therefor, constructed in accordance with my invention. Fig. 2 represents a sectional view, taken on line 2—2 of Fig. 1, showing in plan, a portion of the valve-casing. Fig. 3 represents a longitudinal section of a portion of the valve-stem and the means for operating the valve by hand, a clamp for holding the operating device in fixed position being also shown. Fig. 4 represents a section on line 4—4 of Fig. 1. Fig. 5 represents on a reduced scale a side elevation partly in section of a valve operating device having a piston instead of a diaphragm.

Like reference characters indicate like parts throughout the several views.

This valve is primarily intended to be used in the steam-admission pipe of an air-compressing engine, the controlling device being operated by the air in the compressor when the pressure has reached the desired point, to cut off the steam and cause the engine to stop, though of course it may be used in many other relations, as with the radiators of a steam-heating system, to shut off the steam when the temperature has reached a certain point, and I do not, therefore, limit myself to any specific use of the device.

1 is the valve, having a tapered bearing surface *a*, and *d* the seat, which is formed as an annular edge or corner which may be more or less rounded between the inclined surface *c* and substantially vertical cylindrical surface *b*, so that the contact between the valve and its seat is on a line or very narrow surface, instead of on the extended area usual with valves of this character. This insures a tight contact between the valve and seat, and provides against possibility of solid matter lodging on the seat and preventing tight closing of the valve.

2 is a rod constituting the stem of the valve, which is connected in any suitable manner to the valve to permit rotative movement between them, as by a shouldered head 3 on the end of the stem, and flanges 4 on the valve engaging therewith. The upper end of the stem extends through a stuffing-box 5 and threaded plug 6 mounted in a yoke 7, and carries a knob or disk 8 having an extended spherical upper surface which supports an impervious diaphragm 9 of rubber or other suitable material. The yoke 7 is supported by arms 10 carried by the valve-casing, and to these arms is also secured by screws 11, a cap 12, to the inner surface of which the diaphragm 9 is clamped by a clamping-ring 13 and screws 14. It will be noted that the diaphragm and clamping-ring are connected only to the cap, and supported wholly by the same. This allows the diaphragm to be removed from the rest of the mechanism by disconnection and removal of the cap alone, after which the diaphragm can be removed and readjusted, or a new one substituted by simply disconnecting the ring and re-attaching the same. Thereby attachment of the cap again to the arms 10 places the diaphragm in proper operative position with respect to the valve stem and knob or disk 8 without the necessity of further adjustment and avoids danger of the diaphragm being improperly positioned or the necessity of many readjustments of cap and diaphragm, which frequently occurs in structures when these parts are separate and are assembled by first laying the diaphragm on the disk and then placing the cap upon it. Between the cap 12 and diaphragm is a space 15 which acts as a pressure-chamber into which air or other fluid under pressure is introduced through the inlet 16 to operate the valve. The valve is normally held open by means of a spring 17 which surrounds the valve-stem and bears at its ends on the plug 6 and disk 8. When air under pressure sufficient to overcome the force of the spring is let into the chamber 15, the diaphragm-disk, valve-stem, and valve are forced downward, and the supply of steam to the engine is cut off, and when the air is allowed to escape, the spring opens the valve. A flexible disk 18 of heat-resisting, non-conducting material, such as compressed cork conglomerate, is interposed between the diaphragm and the disk 8 and yoke 7, in order to protect the diaphragm from the deteriorating effects of heat rising from the valve.

It is not essential that a diaphragm should be used with this apparatus, as other removable devices capable of being operated by compressed air or other fluid and of actuating the valve may be substituted, one such device being shown in Fig. 5. In this construction, in place of a yoke or spider 7, there is attached to the arms 10 a short cylinder 71, through the lower head of which extends the valve-stem 2, and of which the cap 12 constitutes the upper head. Fitting in this cylinder is a piston consisting of rigid disks 72, 73, having a packing comprising the washer 74 clamped between the disks and formed with a flexible upturned flange 75 bearing against the sides of the cylinder and a body of mercury 76 held in the annular space between the periphery of disk 73 and the sides of the cylinder, extending above flange 75. The disks and washer surround the end of the valve-steam and are held in place by a clamp-nut 77.

Into the inlet 16 of the air-chamber 15 extends a connection leading from the controlling apparatus 19, which comprises the air-chamber 20, diaphragm 21, valves 22 and 23, and connecting parts. The connection is preferably a threaded nipple 161 adapted to be screwed into the inlet 16 and having a passage communicating with the interior of chamber 20. The diaphragm 21 extends across the chamber 20, being clamped therein to make an air-tight joint therewith, and on opposite sides of the diaphragm are placed rigid guides 24 and 25, shown here as disks which are capable of sliding movement in a guideway in the chamber, their motion being limited by the shoulders 26 27. A plate 28 interposed between the guide 25 and the diaphragm separates the guides far enough so that there may be no danger of the diaphragm being cut between the edges of the guides and the casing. To the under side of the guide 25 is secured a sleeve 29, in which the valve 22 is mounted. The valve 22 is pressed toward its seat 34 by a spring 30, and is prevented from being forced out of the sleeve by a flange 31 on the sleeve engaging a shoulder 32 on the valve. A spring 33 surrounds the sleeve 29, and bears on the under side of the guide 25, tending always to raise the latter and separate the valve 22 from its seat 34.

On the upper side of the guide 24 is secured a sleeve 35, which extends through a guideway formed by a longitudinal aperture in a plug 46 threaded into the casing of the apparatus and carries a stem 36, to which the valve 23 is adjustably connected by a screw-thread which permits the valve to be adjusted longitudinally of the stem. The stem 36 is longitudinally movable in the sleeve 35, and is guided to travel therein without rotating, by a pin 37 engaging a slot 38 in the sleeve. A spring 39 presses the stem 36 and the valve 23 outwardly, to hold the pin 37 in engagement with the end of the slot 38, which forms an abutment 40. A spring 47 bearing between the plug 46 and disk 24 tends to force the disk and valve 23 downward. The tension of the spring may be regulated by screwing the plug 46 toward or away from the disk 24. Obviously, instead of the spring and its adjusting means here shown, an equivalent device consisting of a lever having a movable weight may be used, the lever being supported and connected to the disk or the sleeve in such a way as will cause the weight to act with a downward pressure on the disk and diaphragm. A tube 41 leads from the passage 42, through which air is admitted from the controlling apparatus to the air-chamber 15, and connects with a passage 44 in an upward extension 45 rising from the casing of the controller, the latter passage having an outlet opening into the atmosphere. Air is admitted to the chamber 20 of the controlling apparatus through an inlet 43, to which is connected a pipe leading from the compressed-air reservoir, which is normally always open, so that the air-pressure is the same in the chamber 20 as in the reservoir.

It will be noted that the chamber 20, the outlet 42 therefrom and the inlet 43 thereto constitute parts of a single passage which serves as the fluid inlet passage to the valve-operating chamber 15. A portion of one wall of this passage is constituted by the diaphragm, and within the passage is the closing means consisting of the valve 22 which is actuated by the diaphragm. Accordingly the controller may be described as forming part of the fluid inlet passage to the chamber 15 and including means for opening and closing the passage, which are actuated by the pressure of the fluid in the passage. It is the direct pressure of the same fluid which is attempting to get into the chamber 15 which opens the valve 22, and the latter is not controlled by any external apparatus.

By reason of the manner in which the connection of the controlling apparatus 19 with the valve is constructed and arranged, the said apparatus may be readily connected to and removed from the valve. This enables the controlling apparatus to be made as an attachment which is easily applied when desired, but which may also be disconnected and the valve then operated manually when occasion requires, by means hereinafter described.

The operation of the apparatus will now be described.

With the valve 1 in the position shown in the drawing, the passage from the boiler to the engine is open, and steam can flow freely into the cylinder of the engine, which is now working, pumping air into the reservoir or compression-tank. As soon as the air-pressure in the reservoir and chamber 20 reaches a predetermined amount, determined by the adjustment of the spring 47, the diaphragm 21 and disks 24 and 25 will rise against the pressure of the said spring, bringing the valve 23 against its seat 48, and raising the valve 22 from its seat 34. This opens the passage 42, and allows air to pass into the chamber 15 and press on the diaphragm 9, closing the valve 1 and shutting off the engine. When the air-pressure drops again, until its pressure on the diaphragm is less than the force of the spring 47, the diaphragm is lowered, the valve 22 closed, and the air shut off from the chamber. Simultaneously with the closing of the valve 22, or soon after, depending on the adjustment of the parts, the valve 23 opens and allows the air contained in the chamber 15 to escape through the tube 41 and passage 44, into the chamber 45, and so to the atmosphere, relieving the pressure in the chamber 15 and permitting the spring 17 to open the valve and admit steam to the engine, which starts again. As both passages 42 and 44 are approximately axially arranged in the frame of the controller, valves 22 and 23 are enabled to be located in line with each other and also axially of the controller, thereby producing a compact device of few parts and simply constructed.

It is evident that the steam-valve 1 will not open until the air in the chamber 15 has been allowed to escape by the opening of the valve 23; therefore, by suitably adjusting this valve, the starting of the engine can be made to take place either immediately upon the pressure in the reservoir dropping below that at which the engine is cut off, or some time later, after the pressure has dropped a considerable amount. The valve 22 is mounted yieldingly in the sleeve 29, and the latter is long enough to permit the valve to become seated before sleeve 29 and the diaphragm have reached the lower limit of their travel, the spring 30 yielding to permit continued downward motion of these parts after the seating of the valve. Similarly, the yielding connection between the valve 23 and disk 24 allows this valve to seat before the disk 24, diaphragm, and sleeve 35 have reached the upward limit of their travel, and spring 39 holds valve 23 on its seat for a greater or less time after the diaphragm and disks have begun to move downward, depending on the adjustment of the valve on its stem 36. Accordingly, valve 23 may be made to open and release the air from chamber 15 at any time before or after the closing of valve 22, and thus the time at which the steam-valve is opened and the engine started may be regulated. It is sometimes found desirable to keep the compressed air in the reservoir at a uniform pressure, and in that case, the valves are adjusted so that valve 23 will open as soon as valve 22 seats, while at other times it is desirable to wait until the pressure has fallen a greater or less amount before starting the engine again, when the valve 23 will be adjusted so that it will not open till after valve 22 has closed.

A device for closing the steam-valve 1 manually is provided, consisting of the plug 6 previously described, which is threaded into the yoke 7 and surrounds the valve-stem 2, bearing against a collar 50 on the stem. The plug is provided with a hand-wheel portion 51, and with slots 52 for engagement by a spanner-wrench. When it is necessary to shut off the steam for any considerable period, or when the automatic controller is not working or is detached the plug is turned by hand, or with a spanner, to close or open the valve. The spring 17 retains the collar 50 in engagement with the plug.

The plug may be locked in any position by a friction-brake consisting of a block 53 mounted loosely in a sleeve 56 formed on the yoke and engaging the threads of the plug, being pressed against them by a set-screw 54 threaded into the sleeve. A cap 55 screwed over the end of the sleeve protects the head of the set-screw. A spring 57 is shown as interposed between the block 53 and set-screw to hold the block yieldingly against the plug, but this spring may, if desired, be omitted.

The valve may obviously be used for controlling the flow of other fluids than steam, and I do not, therefore, wish to limit my invention to a device for operating a steam-valve, but desire to claim it as applicable to any kind of fluid-controlling valve.

What I claim is:—

1. A controlling appliance for valves, comprising a valve, a stem connected to the valve, a stationary support, a manually operated device rotatably mounted on the stem and in screw-threaded engagement with said support and externally accessible for manually opening and closing the valve, a shoulder on the stem in engagement with said device, and a movable member in engagement with said stem, adapted to be operated by fluid under pressure, the stem being movable endwise relatively to said device.

2. An operating device for valves, comprising a chamber, a valve, a movable member forming one wall of said chamber in engagement with the valve and adapted to operate the same when fluid under pressure is admitted to the chamber, and a controller for automatically admitting fluid to the chamber, comprising a chamber in communication with the first-named chamber, an imperforate diaphragm extending across the same, a valve holder, a spring tending to retain said holder against one side of the diaphragm, a valve carried by said holder and caused by said spring to open the communication between the chambers when the pressure in the second chamber reaches a predetermined amount, and a spring acting on said diaphragm in opposition to the fluid pressure to close the communication when the pressure diminishes.

3. A controlling device for regulating the admission of compressed air to the air-chamber of a pneumatic valve-operating apparatus, comprising a closed chamber, an imperforate diaphragm therein, a guide on each side of said diaphragm fitting in and arranged to slide in a guide-way in said chamber, an inlet for admitting air to said chamber to move the diaphragm in one direction, springs acting on said guides tending to hold them against the diaphragm, one of which is sufficient to move the diaphragm in opposition to the air pressure when such pressure is below a predetermined amount, a passage leading from said chamber to the air-chamber of the valve-operating apparatus, a valve connected to one of the guides seated in said passage and adapted to move with the guide to alternately close and open said passage, a passage leading from the first-named passage and having an outlet to the atmosphere, and a valve adjustably and yieldingly connected to the other of said before-mentioned guides and movable therewith, arranged to seat against the outlet of said last-named passage, the arrangement and operation being such that one valve is adapted to close the passage in which it seats, while the other is away from its seat.

4. A valve controlling appliance comprising, in combination, a valve, a stem connected to said valve, a movable member operable by fluid pressure and arranged to act on said valve in a manner such as to move it with respect to its seat, yielding means tending to move the valve oppositely to the movement given by said member, a stationary support, and a manually operated device adjustably connected to said support and engaged with said valve stem, arranged to move the latter and the valve in opposition to said yielding means, the stem being freely movable relatively to the said device by said movable member.

5. A valve-controlling appliance comprising a valve, a stem connected to the valve, a shoulder on said stem, a fixed support, a sleeve mounted on said stem in engagement with said shoulder and in threaded engagement with said support, a spring engaging the sleeve and an abutment on the stem tending to move the stem in a direction to open the valve and hold the shoulder against the sleeve the stem being freely movable in the opposite direction through the sleeve, a movable member in engagement with said stem adapted to be operated by fluid under pressure, and provisions on said sleeve by which the sleeve may be turned manually to close and open the valve.

6. A valve-controlling appliance comprising a valve, a stem connected to the valve, a shoulder on said stem, a fixed support, a sleeve mounted on said stem in engagement with said shoulder and in threaded engagement with said support, a spring engaging the sleeve and an abutment on the stem tending to move the stem in a direction to open the valve and hold the shoulder against the sleeve, a movable member in engagement with said stem adapted to be operated by fluid pressure, provisions on said sleeve by which the sleeve may be turned to move the sleeve relatively to the fixed support, and means mounted on the support for locking the sleeve in fixed position.

7. In combination with a valve, a stem extending therefrom, a pressure chamber, a diaphragm forming one wall of such chamber and caused by pressure therein to actuate said valve, and a flexible impervious protective sheet interposed between such diaphragm and valve, covering the entire area on the side thereof nearest to the valve, to protect the diaphragm from injurious effects of heated air or other fluid rising from the valve.

8. The combination of a valve casing, arms extending therefrom, a yoke secured to said arms, a stem connected to said valve and guided by said yoke, a cap adapted to be secured to said arms adjacent to the end of said valve stem and outside of the yoke, a diaphragm, a clamp ring detachably secured to said cap and clamping the periphery of the diaphragm to the cap, and a flexible protective sheet interposed between said diaphragm and valve stem and clamped at its edges between the said clamp ring and yoke.

In testimony whereof I have affixed my signature, in presence of two witnesses.

GEORGE A. WELD.

Witnesses:
A. C. RATIGAN,
C. F. BROWN.

---

Copies of this patent may be obtained for five cents each, by addressing the "Commissioner of Patents, Washington, D. C."